United States Patent
Dowdy

(10) Patent No.: US 8,944,220 B2
(45) Date of Patent: Feb. 3, 2015

(54) MULTIPLE ATV LOCK STATION

(76) Inventor: Kristopher Juel Dowdy, Ailey, GA (US)

( * ) Notice: Subject to any disclaimer, the term of this patent is extended or adjusted under 35 U.S.C. 154(b) by 0 days.

(21) Appl. No.: 13/605,484

(22) Filed: Sep. 6, 2012

(65) Prior Publication Data
US 2014/0000326 A1   Jan. 2, 2014

Related U.S. Application Data

(60) Provisional application No. 61/531,123, filed on Sep. 6, 2011.

(51) Int. Cl.
*B60P 3/07*   (2006.01)
*E05B 83/00*  (2014.01)
*B60R 25/09*  (2013.01)

(52) U.S. Cl.
CPC .............. *E05B 83/00* (2013.01); *B60R 25/093* (2013.01)
USPC ........ 188/32; 410/30; 410/19; 410/9; 410/22; 70/259

(58) Field of Classification Search
USPC .............................. 70/237, 259, 260; 414/563
See application file for complete search history.

(56) References Cited

U.S. PATENT DOCUMENTS

| | | | | |
|---|---|---|---|---|
| 3,581,846 A * | 6/1971 | Janus | | 188/32 |
| 3,687,238 A * | 8/1972 | Carpenter | | 188/32 |
| 3,695,071 A * | 10/1972 | West | | 70/225 |
| 3,845,643 A * | 11/1974 | Barrett | | 70/18 |
| 4,761,015 A * | 8/1988 | Carr | | 280/402 |
| 4,840,534 A * | 6/1989 | Totty | | 414/563 |
| 4,968,052 A * | 11/1990 | Alm et al. | | 280/402 |
| 4,993,909 A * | 2/1991 | Hamman | | 414/563 |
| 5,427,210 A * | 6/1995 | Willaford | | 188/32 |
| 5,593,260 A * | 1/1997 | Zimmerman | | 410/20 |
| 5,908,280 A * | 6/1999 | Allison | | 414/563 |
| 5,909,996 A * | 6/1999 | Cowell | | 414/563 |
| 6,896,223 B2 * | 5/2005 | Fulcher et al. | | 244/111 |
| 6,935,145 B2 * | 8/2005 | Howitt | | 70/226 |
| 7,121,508 B2 * | 10/2006 | Fulcher et al. | | 244/111 |
| 7,494,313 B2 * | 2/2009 | Craze | | 414/563 |
| 8,074,775 B2 * | 12/2011 | Arnold | | 188/32 |
| 2004/0045774 A1 * | 3/2004 | D'Alessio | | 188/4 R |
| 2005/0158162 A1 * | 7/2005 | Shubert | | 414/563 |

* cited by examiner

*Primary Examiner* — Thomas Irvin
(74) *Attorney, Agent, or Firm* — Brian D. Bellamy

(57) ABSTRACT

A vehicular anti-theft mechanism having cradles for the vehicle's wheels connected to opposing ends of a central shaft. Two sliding locks are mounted on the central shaft and are moveable relative to the shaft. Each of these sliding locks, e.g. chains, secure the vehicle's axle to the anti-theft device.

9 Claims, 2 Drawing Sheets

MULTIPLE ATV LOCK STATION

PRIORITY CLAIM

This application claims the benefit of U.S. Provisional Application No. 61/531,123, filed Sep. 6, 2011 by Kristopher J. Dowdy who is the inventor of claims 1 through 9 of the '123 provisional application and is the inventor of claims 1 through 9 of the instant, non-provisional application.

CROSS-REFERENCE TO RELATED APPLICATIONS

None

FEDERALLY SPONSORED REWARDS OR DEVELOPMENT

None

NAME OF PARTIES TO A JOINT RESEARCH AGREEMENT

None

REFERENCE TO "SEQUENCE LISTING"

None

FIELD OF THE INVENTION

The present invention is directed to an anti-theft locking mechanism for all-terrain vehicles. Specifically, the device provides a mechanism for securing a vehicle's axle to the device and preventing access to the vehicle's tires.

SUMMARY OF THE INVENTION

The present invention is directed to an anti-theft device for all-terrain vehicles. Exemplary all-terrain vehicles for use with the present invention include, but are not limited to, four-wheelers, three-wheelers, golf carts, and utility vehicles such as a Kawasaki Mule™ and a John Deere Gator™. The anti-theft device comprises two wheel cradles connected to opposing ends of an adjustable shaft. The adjustable shaft allows a user to set the width of the wheel cradles to the width of the vehicle's tire base. The device further comprises two locking slides that can move along the adjustable shaft. Each locking slide has a means for securing the vehicle axle to the device. The device further comprises one or more mounting brackets for optionally securing the anti-theft device to a solid surface such as, but not limited to, a concrete surface, trailer bed, or truck bed. The mounting bracket can be secured to the solid surface using any standard mounting bracket means, such as a bolt. The mounting bracket design and means for securing the mounting bracket may be varied based on the type of solid surface to which it is attached. In certain exemplary embodiments, the device is readily removable and transferable between solid surfaces. Use of the device does not depend on mounting the device to a solid surface, and the device may be used unanchored.

DETAILED DESCRIPTION

Figure 1:
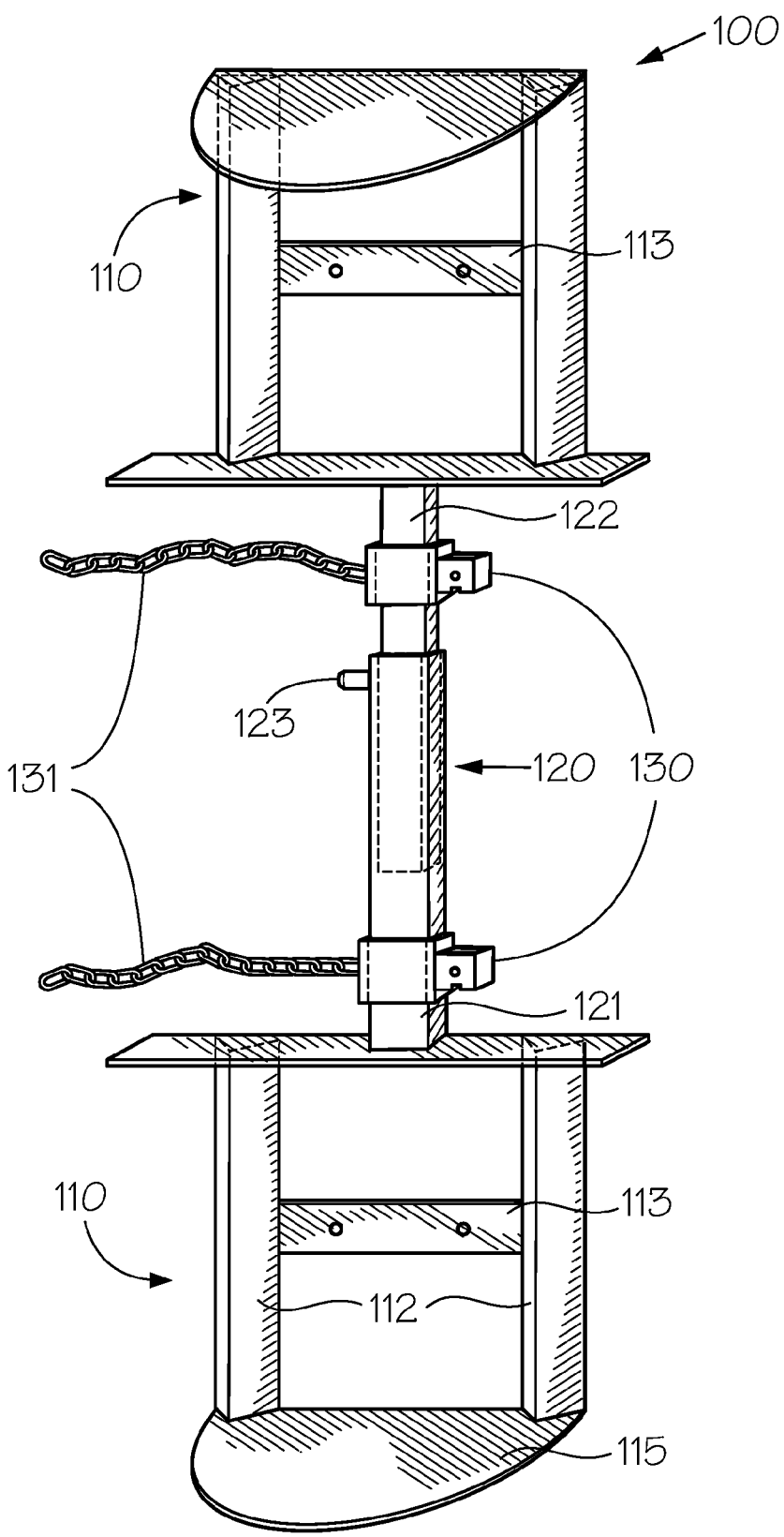
FIG. 1 is a plan view of an exemplary anti-theft device of the present invention.

An exemplary embodiment of the anti-theft device 100 of the present invention is shown in FIG. 1. The anti-theft device comprises a set of wheel cradles 110 attached by a central shaft 120. A wheel cradle may comprise a support element 111 and a first and second tire bracket 112 extending perpendicular to the support element 111. The first and second tire bracket are separated by a distance sufficient for a bottom portion of a tire to sit therein. In certain exemplary embodiments the tire brackets 112 are adjustable along the supporting bracket 111 to provide flexibility in accepting different vehicle tire sizes. The wheel cradle may optionally further comprise a mounting bracket 113. The mounting bracket 113 may be positioned or integrated directly into the supporting bracket 111. Alternatively, the mounting bracket 113 may be attached at a point along the first and second tire brackets 112 parallel to the supporting element 111. The mounting bracket is designed to allow the anti-theft device 100 to be securely fastened to a solid surface, such as an asphalt or concrete surface, a truck bed, or a trailer bed. The mounting bracket may be secured to the solid surface using any standard mounting means for attaching fixtures to such surfaces. In one exemplary embodiment, the mounting bracket 113 contains one or more holes for the insertion of bolts for securing the anti-theft device 100 to the solid surface. The wheel cradles 110 may be manufactured from any suitable material with sufficient strength and durability to allow a vehicle to be securely attached thereto. The second supporting bracket 115 may be attached to the opposite end of first and second tire brackets 112 from the first support bracket 112. In certain exemplary embodiments, a plate 116 may be attached at a bottom end to either to the second support bracket 115 or directly to tire brackets 112. The top end of the plate extends vertically and is of a sufficient height to block access to a tire's lug nuts, thereby preventing tire removal. The plate may be a square plate, a rectangular shape, a half-round shape, or any shape sufficient to block access to a tire's lug nuts or other means for securing the tire to the axle of the vehicle.

In certain exemplary embodiments, the central shaft may comprise a fixed component 121 attached to one wheel cradle and an adjustable shaft component 122 attached to the other wheel cradle that inserts into and is movable relative to the fixed shaft component. The adjustable shaft further comprises an adjustable shaft lock 123 to secure the central shaft 120 in a fixed position. An adjustable shaft lock 123 may comprise a bolt insertable into a first hole on the fixed portion of the central shaft 120 and a second hole in the adjustable portion of the central shaft when the fixed portion and adjustable portion of the central shaft are properly aligned. In such an embodiment, the holes in the fixed and adjustable portions of the central shaft may be machined at multiple points to allow for adjustment of the shaft over a range of widths providing flexibility to secure vehicles with varying wheel bases.

Continuing in reference to the exemplary embodiment shown in FIG. 1, the device contains two locking slides 130 around the central shaft 120 wherein the sliding locks are moveable along the central shaft allowing for optimum positioning of the sliding locks relative to a given vehicle's axle. The sliding locks of the present invention allow the locks to be positioned between any gearbox and transfer case arrangement for a given vehicle, while ensuring the device is secured to the vehicle in-line with the axle and the wheel. Each locking slides comprises an axle attachment mechanism 131 for locking the device 100 to the axle of a vehicle. An exemplary axle attachment mechanism is a chain, however other suitable mechanisms that allow secure attachment of the device to the vehicles axle may be used.

Figure 2:
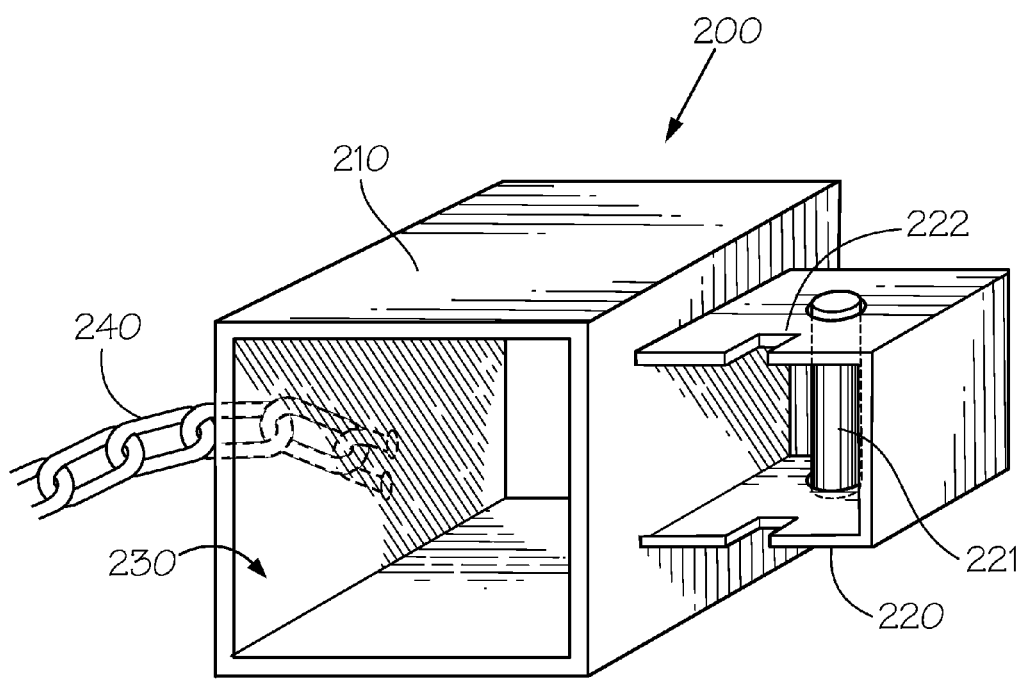
FIG. 2 is a plan view of an exemplary locking slide of the present invention.

Turning now to FIG. 2, a more detailed drawing of an exemplary sliding lock is provided. The sliding lock 200 comprises the slide body 210, a central channel for receiving the device's central shaft 120, and a locking mechanism 220. In the exemplary embodiment shown in FIG. 2, a chain 240 may be welded to one side of the sliding lock opposite the locking mechanism 220. The chain is then looped over the vehicle axle and secured to the locking mechanism. An exemplary locking mechanism can comprise one or more chain notches 222 and lock pin 221 for locking the free end of the chain to the locking mechanism.

In use, the device 100 is secured to an appropriate surface. The wheel cradles 110 are set to an appropriate width based on the wheel base of the vehicle to be secured. Once the appropriate width is set the central shaft 120 may be locked into position. The vehicle is then driven onto the device so that the front or rear tires rest within the wheel cradle 110. In those embodiments in which the tire brackets 112 are adjustable, said brackets may be adjusted to more securely engage the tire. The sliding locks 130 are then positioned along the axle. The optimum point along an axle at which the vehicle may be secured will vary by vehicle. One of ordinary skill in the art will recognize and be able to position the sliding locks in the appropriate positions. The axle attachment mechanisms 131 are then looped over the vehicle axle and secured to the locking mechanism 221 of the sliding locks 130, thereby securing the vehicle to the device.

Components of the device may be manufactured of a variety of materials from metals to rigid plastic materials. Exemplary materials suitable for use in the present invention include, but are not limited to, steel, stainless steel, high carbon steels, aluminum, or combinations thereof. Design considerations to be considered when selecting suitable component materials include strength, durability, weight, and cost of manufacturing.

Although specific embodiments of the invention may have been described above in detail, the description is merely for purposes of illustration. Various modifications can be made by those having ordinary skill in the art without departing from the spirit and scope of the invention defined in the following claims, the scope of which is to be accorded the broadest interpretation so as to encompass such modifications and equivalent structure.

I claim:

1. An anti-theft device for all-terrain vehicles comprising:
   a telescopic central shaft comprising a first shaft and a second shaft that are telescopically extendable in a longitudinal direction with respect to each other;
   a set of wheel cradles, each wheel cradle being connected to an opposing end of the telescopic central shaft;
   two sliding locks located on the telescopic central shaft, the sliding locks being independently moveable along the longitudinal direction of the telescopic central shaft relative to the telescopic central shaft and the wheel cradles,
   wherein each sliding lock includes a locking member attachable to a vehicle's axle for securing the vehicle's axle to the anti-theft device.

2. The device of claim 1, where the telescopic central shaft is adjustable to the appropriate width of the vehicles wheels, and then fixed in position.

3. The device of claim 1, wherein the wheel cradles comprise a supporting member and two tire brackets attached perpendicular to the supporting member.

4. The device of 3, further comprising a vertical plate attached to the tire brackets opposite their attachment to the supporting member, wherein the plate is of a sufficient height so as to block access to the axle's point of attachment to a tire.

5. The device of claim 3, wherein the supporting member is adapted to mount to a solid surface.

6. The device of claim 1, wherein the wheel cradles further comprise a mounting bracket.

7. The device of claim 1, wherein each sliding lock comprises a central body, wherein the central body contains a central channel for receiving the telescopic central shaft, and wherein the locking member is attached to one vertical face of the sliding lock, and a locking mechanism is attached to an opposite vertical face of the sliding lock.

8. The device of claim 7, wherein the locking member is a chain.

9. The device of claim 8, wherein the locking mechanism comprises at least one chain notch and a lock pin.

* * * * *